US012795447B2

(12) United States Patent
Nagashima

(10) Patent No.: US 12,795,447 B2
(45) Date of Patent: Nov. 10, 2026

(54) RADIO MASTER UNIT WITH USER-INPUT-BASED OFDMA SCHEME SELECTION AND DATA VOLUME AVERAGING, CONTROL METHOD FOR RADIO MASTER UNIT, AND NON-TRANSITORY COMPUTER-READABLE MEDIUM

(71) Applicant: NEC Platforms, Ltd., Kawasaki (JP)

(72) Inventor: Shigematsu Nagashima, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 258 days.

(21) Appl. No.: 18/712,761

(22) PCT Filed: Oct. 28, 2022

(86) PCT No.: PCT/JP2022/040509
§ 371 (c)(1),
(2) Date: May 23, 2024

(87) PCT Pub. No.: WO2023/095557
PCT Pub. Date: Jun. 1, 2023

(65) Prior Publication Data

US 2025/0024326 A1 Jan. 16, 2025

(30) Foreign Application Priority Data

Nov. 29, 2021 (JP) ................................ 2021-192844

(51) Int. Cl.
*H04W 28/08* (2023.01)
*G06F 3/048* (2013.01)
(Continued)

(52) U.S. Cl.
CPC ........... *H04W 28/08* (2013.01); *G06F 3/048* (2013.01); *H04B 7/024* (2013.01); *H04L 5/0007* (2013.01);
(Continued)

(58) Field of Classification Search
CPC ..... H04W 28/08; H04W 56/00; H04W 72/02; H04W 72/0453; H04W 72/1263;
(Continued)

(56) References Cited

U.S. PATENT DOCUMENTS 12,389,286 B2 * 8/2025 Kang .................... H04L 43/065
2013/0070643 A1 * 3/2013 Udou .................... H04L 41/145
370/254
(Continued)

FOREIGN PATENT DOCUMENTS

JP 2013-201472 A 10/2013
JP 2018-142896 A 9/2018
(Continued)

OTHER PUBLICATIONS

International Search Report for PCT Application No. PCT/JP2022/040509, mailed on Jan. 10, 2023.

*Primary Examiner* — Joshua Kading

(57) ABSTRACT

In a radio master unit of the present disclosure, an OFDMA preferential setting unit preferentially selects, based on user input information, the OFDMA scheme as a communication scheme for performing communication with a plurality of radio slave units connected to the master unit. When the setting to preferentially select the OFDMA scheme is made, a connected-slave-unit detection unit detects the number of the radio slave units to be communicated among a plurality of the radio slave units. When the number of the radio slave units to be communicated with is larger than a predetermined number, an OFDMA control unit averages the volume
(Continued)

of data to be transmitted and received to and from the radio slave units to be communicated with among the radio slave units to be communicated with, and executes control of OFDMA communication with the radio slave units to be communicated with.

10 Claims, 13 Drawing Sheets

(51) Int. Cl.

| | |
|---|---|
| ***H04B 7/024*** | (2017.01) |
| ***H04L 5/00*** | (2006.01) |
| ***H04W 56/00*** | (2009.01) |
| ***H04W 72/02*** | (2009.01) |
| ***H04W 72/0453*** | (2023.01) |
| ***H04W 72/1263*** | (2023.01) |
| ***H04W 72/51*** | (2023.01) |

(52) U.S. Cl.
CPC ........... *H04W 56/00* (2013.01); *H04W 72/02* (2013.01); *H04W 72/0453* (2013.01); *H04W 72/1263* (2013.01); *H04W 72/51* (2023.01)

(58) Field of Classification Search
CPC ........ H04W 72/51; G06F 3/048; H04B 7/024; H04L 5/0007
See application file for complete search history.

(56) References Cited

U.S. PATENT DOCUMENTS

| | | | | |
|---|---|---|---|---|
| 2021/0298042 | A1* | 9/2021 | Siraj | H04B 7/0452 |
| 2023/0091461 | A1* | 3/2023 | Sumita | H04W 12/0431 370/329 |
| 2023/0370669 | A1* | 11/2023 | Kim | H04N 21/422 |
| 2024/0107306 | A1* | 3/2024 | Yoshikawa | H04W 76/15 |

FOREIGN PATENT DOCUMENTS

| | | | |
|---|---|---|---|
| JP | 6949156 | B2 | 10/2021 |
| WO | 2013/046502 | A1 | 4/2013 |

* cited by examiner

RADIO MASTER UNIT WITH USER-INPUT-BASED OFDMA SCHEME SELECTION AND DATA VOLUME AVERAGING, CONTROL METHOD FOR RADIO MASTER UNIT, AND NON-TRANSITORY COMPUTER-READABLE MEDIUM

This application is a National Stage Entry of PCT/JP2022/040509 filed on Oct. 28, 2022, which claims priority from JP2021-192844 filed on Nov. 29, 2021, the contents of all of which are incorporated herein by reference, in their entirety.

TECHNICAL FIELD

The present disclosure relates to a radio master unit, a control method for the radio master unit, and a non-transitory computer-readable medium.

BACKGROUND ART

As a method for performing communication between a radio master unit and radio slave units connected to the radio master unit, OFDM (Orthogonal Frequency Division Multiplexing) modulation scheme and OFDMA (Orthogonal Frequency Division Multiple Access) scheme (see, for example, Patent Literature 1) are used.

For example, when school classes are being conducted or when competitive games are being played, there are a predetermined number of more of radio slave units connected to a radio master unit. In such a case, when the OFDM modulation scheme is used, the communication completion time of a communication performed between the radio master unit and the radio slave units is longer than the communication completion time of a communication performed using the OFDMA scheme, and at the same time, there occurs delay in data transmission due to the re-transmission of data from the radio slave units caused by the collision between the transmission signals transmitted from the radio slave units to the radio master unit.

CITATION LIST

Patent Literature

Patent Literature 1: Japanese Patent No. 6949156

SUMMARY OF INVENTION

Technical Problem

However, in the background art according to Patent Literature 1, it is not possible to select a communication scheme such as an OFDM modulation scheme or an OFDMA scheme even when a predetermined number or more of radio slave units are connected to a radio master unit. Therefore, the background art has a problem that the communication completion time of a communication performed between the master unit and the radio slave units cannot be shortened and occurrence of delay in data transmission cannot be reduced.

The present disclosure has been made in view of the aforementioned problem and an object of the present disclosure is to provide a radio master unit, a control method for the radio master unit, and a non-transitory computer-readable medium each adapted to shorten the communication completion time of a communication performed between the radio master unit and radio slave units and reduce occurrence of delay in data transmission.

Solution to Problem

According to the present disclosure, a radio master unit includes:

- an OFDMA preferential setting unit configured to make a setting based on user input information to preferentially select the OFDMA (Orthogonal Frequency Division Multiple Access) scheme as a communication scheme for performing communication with a plurality of radio slave units connected to a master unit;
- a connected-slave-unit detection unit configured to detect the number of the radio slave units to be communicated with among the plurality of the radio slave units connected to the master unit when the setting to preferentially select the OFDMA scheme is made; and
- an OFDMA control unit configured to execute control of OFDMA communication with the radio slave units to be communicated with by averaging the volume of data to be transmitted and received to and from the respective radio slave units to be communicated with among the radio slave units to be communicated with when the number of the radio slave units to be communicated with is larger than a predetermined number.

According to the present disclosure, a control method for a radio master unit includes:

- making a setting based on user input information to preferentially select the OFDMA scheme as a communication scheme for performing communication with a plurality of radio slave units connected to the radio master unit;
- detecting the number of the radio slave units to be communicated with among the plurality of the radio slave units connected to the radio master unit when the setting is made to preferentially select the OFDMA scheme; and
- executing control of OFDMA communication with the radio slave units to be communicated with by averaging the volume of data to be transmitted and received to and from the respective radio slave units to be communicated among the radio slave units to be communicated with when the number of the radio slave units to be communicated with is larger than a predetermined number.

According to the present disclosure, a non-transitory computer-readable medium stores a program for causing a computer to execute processes of:

- making a setting based on user input information to preferentially select the OFDMA scheme as a communication scheme for performing communication with a plurality of radio slave units connected to a radio master unit;
- detecting the number of the radio slave units to be communicated with among the plurality of the radio slave units connected to the radio master unit when the setting is made to preferentially select the OFDMA scheme; and
- executing control of OFDMA communication with the radio slave units to be communicated with by averaging the volume of data to be transmitted and received to and from the respective radio slave units to be communicated with among the radio slave units to be communicated with when the number of the radio slave units to be communicated with is larger than a predetermined number.

Advantageous Effects of Invention

According to the present disclosure, it is possible to provide a radio master unit, a control method for the radio master unit, and a non-transitory computer-readable medium each adapted to shorten a communication completion time of a communication performed between the radio master unit and the radio slave units and reduce occurrence of delay in data transmission.

EXAMPLE EMBODIMENT

Figure 1:
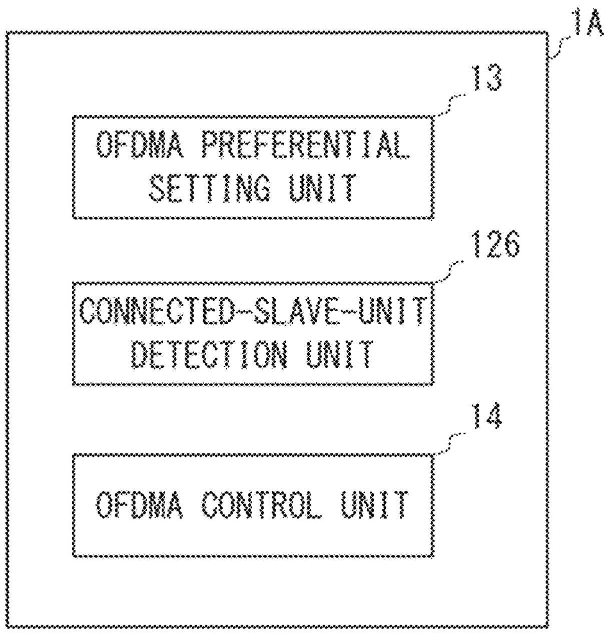
FIG. 1 is a block diagram showing a radio master unit according to a first example embodiment.

Specific embodiments in which the present disclosure is applied will be described in detail hereinafter with reference to the drawings. In each drawing, the same elements are allocated the same reference numerals, and duplicate descriptions thereof will be omitted as necessary for clarity of description.

First Example Embodiment

First, a configuration of a radio master unit 1A according to a first example embodiment will be described with reference to FIG. 1.

The radio master unit 1A includes an OFDMA preferential setting unit 13, a connected-slave-unit detection unit 126, and an OFDMA control unit 14.

The OFDMA preferential setting unit 13 makes a setting based on user input information to preferentially select the OFDMA scheme for a communication scheme for performing communication with a plurality of radio slave units connected to the radio master unit 1.

When a setting to preferentially select the OFDMA scheme is made, the connected-slave-unit detection unit 126 detects the number of the radio slave units to be communicated with among a plurality of the radio slave units connected to the master unit.

When the number of the radio slave units to be communicated with is larger than a predetermined number, the OFDMA control unit 14 averages the volume of data to be transmitted and received to and from the respective radio slave units to be communicated with among the radio slave units to be communicated with, and executes control of OFDMA communication with the radio slave units to be communicated with.

As described above, the radio master unit 1A according to the first example embodiment can select the OFDMA scheme for the communication scheme to be used when a predetermined number or more of the radio slave units are connected to the radio master unit 1A. Therefore, the radio master unit 1A is capable of shortening the communication completion time with the radio slave units and reducing occurrence of delay in data transmission.

Second Example Embodiment

Figure 2:
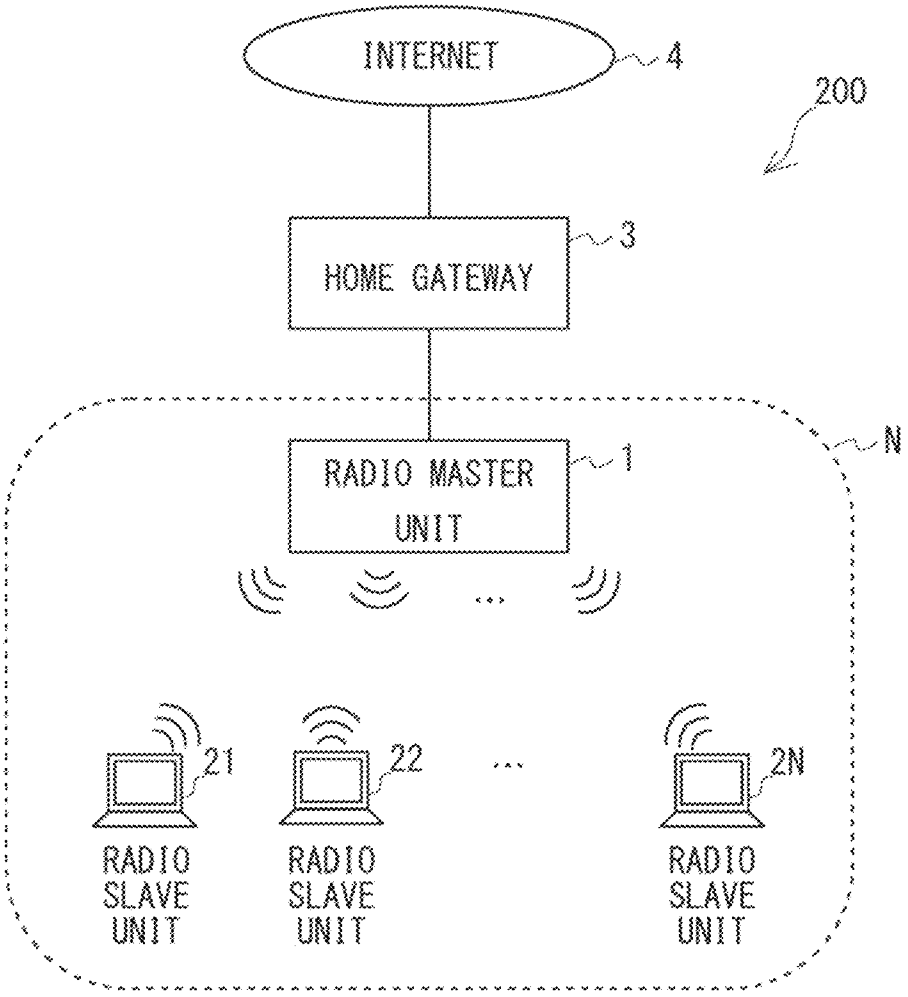
FIG. 2 is a diagram showing a configuration of a communication system according to a second example embodiment.

First, a configuration of a communication system 200 according to a second example embodiment will be described with reference to FIG. 2.

The communication system 200 includes the radio master unit 1, radio slave units 2 (radio slave units 21 to 2N), and a home gateway 3.

The radio master unit 1 is a wireless LAN (Wireless Local Area Network) device that supports the IEEE802.11ax standard. Although the standard of the radio master unit 1 is IEEE802.11ax in this example embodiment, it is not limited to IEEE802.11ax and may be, for example, IEEE802.11ac.

The radio master unit 1 and the radio slave units 2 (radio slave units 21 to 2N) configure a radio network N in which the radio master unit 1 and the radio slave units 2 are wirelessly connected in an infrastructure mode within the coverage of the radio waves, and the radio master unit 1 communicates with each of the connected radio slave units 2. The radio master unit 1 supports an OFDMA (Orthogonal Frequency Division Multiple Access) scheme as a communication scheme for performing communication with the radio slave units 2. The radio master unit 1 supports at least one of a MU-MIMO (multiuser MIMO) scheme and an OFDM (Orthogonal Frequency Division Multiplexing: orthogonal frequency division multiplexing) modulation scheme as a communication scheme for performing communication with the radio slave units 2.

Each of the radio slave units 2 (radio slave units 21 to 2N) is, for example, a fixed terminal such as a personal computer (PC) or a mobile terminal such as a smartphone or a tablet, and communicates with the radio master unit 1.

The home gateway 3 serves as a relay point of the connection between the radio master unit 1 and the Internet 4.

Figure 3:
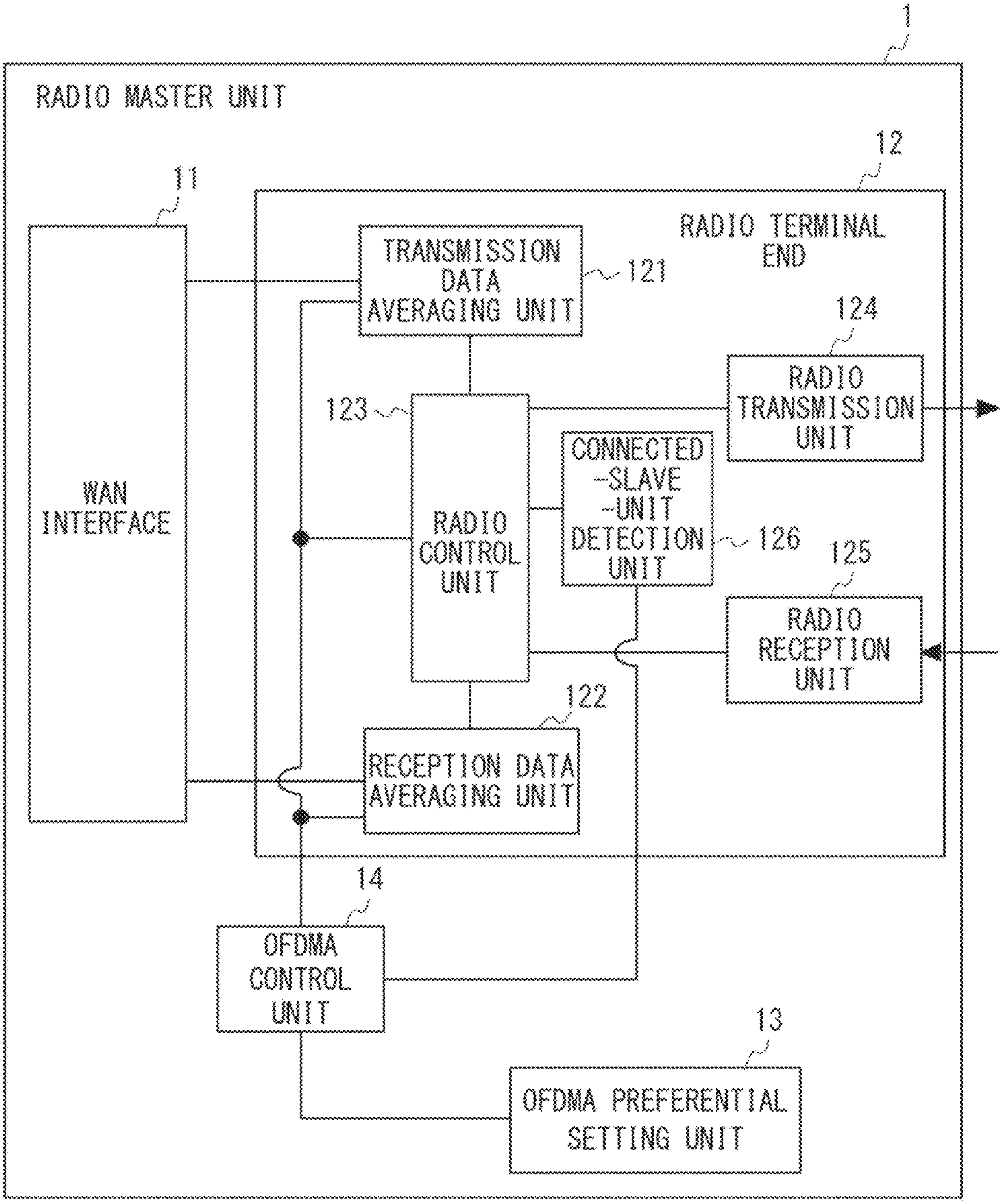
FIG. 3 is a block diagram showing a configuration of a radio master unit according to the second example embodiment.

Next, a configuration of the radio master unit 1 according to the second example embodiment will be described with reference to FIG. 3. The radio master unit 1 includes a WAN interface 11, a radio terminal end 12, the OFDMA preferential setting unit 13, and the OFDMA control unit 14.

The WAN interface 11 functions as an end point of the WAN interface connected to the Internet 4.

The radio terminal end 12 receives data from a host apparatus such as the home gateway 3 via the WAN interface 11. The radio terminal end 12 also has a function of terminating the radio interface connected to the radio slave units 2. Specifically, the radio terminal end 12 includes a transmission data averaging unit 121, a reception data averaging unit 122, a radio control unit 123, a radio transmission unit 124, a radio reception unit 125, and the connected-slave-unit detection unit 126.

When the transmission data averaging unit 121 communicates with the radio slave units 2 using the OFDMA scheme, the volume of transmission data to be transmitted to the respective radio slave units 2 is averaged among the radio slave units 2 to be communicated with. When the reception data averaging unit 122 communicates with the radio slave units 2 using the OFDMA scheme, the volume of data received from the radio slave units 2 is de-averaged.

The radio control unit 123 controls the radio modulation scheme for the transmission data transmitted to the radio slave units 2. The radio control unit 123 also controls the radio modulation scheme for the reception data received from the radio slave units 2.

The radio transmission unit 124 transmits transmission data modulated by the radio control unit 123 to the radio slave units 2. The radio reception unit 125 receives data from the radio slave units 2 and furnishes the received data to the radio control unit 123.

When the OFDMA preferential selection setting described later is in effect, the connected-slave-unit detection unit 126 groups the radio slave units 2 to be communicated with among the radio slave units 2 connected to the radio master unit 1. Specifically, the connected-slave-unit detection unit 126 acquires, among various information on the radio slave units 2 connected to the radio master unit 1, information on whether the radio master unit 1 supports OFDMA communication, information on the frequency used for performing communication with the radio master unit 1, information on the channel used for performing communication with the radio master unit 1, and information on the encryption method used for performing communication with the radio master unit 1 (group connection information). The connected-slave-unit detection unit 126 supports OFDMA communication and groups the slave units at match the frequency used for communication with the radio master unit 1, the channel used for communication with the radio master unit 1, and the encryption method used for communication with the radio master unit 1.

The connected-slave-unit detection unit 126 then detects the number of the radio slave units 2 to be grouped. The connected-slave-unit detection unit 126 includes the detected number of the radio slave units 2 to be grouped in the group connection information and furnish it to the OFDMA control unit 14.

The OFDMA preferential setting unit 13 has a function of making a setting (hereinafter referred to as the OFDMA preferential selection setting) based on the user input information to preferentially select the OFDMA scheme as the communication scheme for performing communication with the radio slave units 2 connected to the radio master unit 1. The OFDMA preferential setting is enabled or disabled according to the user operation of the GUI (Graphical User Interface). The GUI is preferably installed in the radio master unit 1, but it is not limited to the radio master unit 1 and may be installed, for example, in an external device connected to the radio master unit 1.

When the OFDMA preferential selection setting is in effect, the OFDMA control unit 14 performs the following determination based on the group connection information of the radio slave units 2 acquired from the connected-slave-unit detection unit 126. The OFDMA control unit 14 determines whether or not the number of the radio slave units 2 to be grouped is larger than a predetermined number. The predetermined number is, for example, the number of the radio slave units 2 that the radio master unit 1 can simultaneously communicate using the MU-MIMO scheme.

When the OFDMA control unit 14 determines that the number of the radio slave units 2 to be grouped is larger than a predetermined number, it controls a scheduler such as allocation of subcarrier frequencies to the radio slave units 2 to be grouped and a trigger frame. Here, the OFDMA control unit 14 allocates the subcarrier frequencies having fixed subcarrier spacing to the radio slave units 2 to be grouped. The OFDMA control unit 14 averages the volume of data to be transmitted and received to and from the radio slave units 2 to be grouped, and executes control of OFDMA communication with the radio slave units 2 to be grouped.

On the other hand, when the OFDMA preferential selection setting is invalid, the OFDMA control unit 14 communicates with the connected radio slave units 2 using the MU-MIMO scheme or the OFDM modulation scheme. The OFDMA control unit 14 communicates with the connected radio slave units 2 using the MU-MIMO scheme or the OFDM modulation scheme when it determines that the number of the radio slave units 2 to be grouped is equal to or less than a predetermined number.

Figure 4:
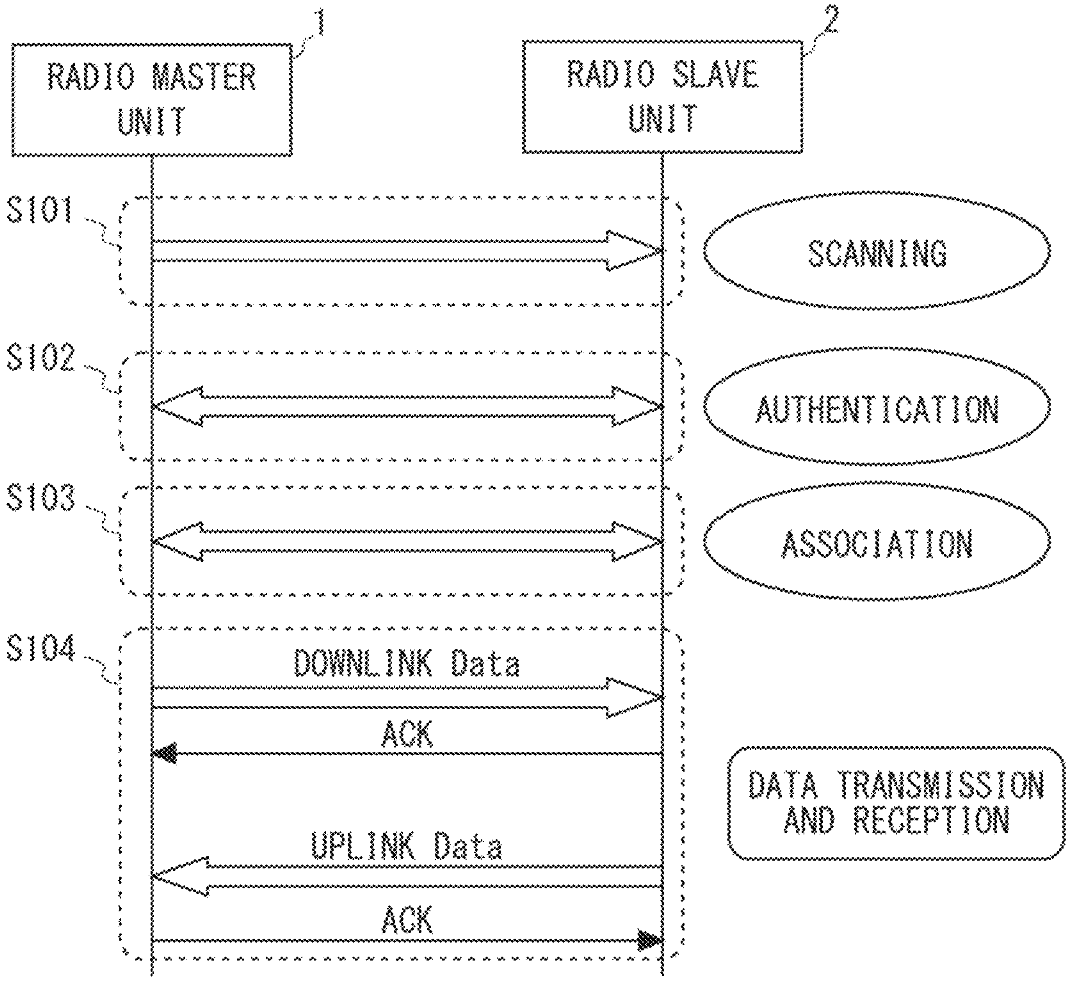
FIG. 4 is a sequence diagram showing a schematic operation of a communication system according to the second example embodiment.

Next, a schematic operation of communication between the radio master unit 1 and one of the radio slave units 2 according to the second example embodiment will be described with reference to FIG. 4.

First, the radio slave unit 2 scans the beacon information of the connectable radio master unit 1 and performs mutual confirmation with the master unit 1 of the used channel, SSID, the encryption method, etc. (Step S101). Next, the radio slave unit 2 establishes a radio connection with the radio master unit 1 through authentication (Step S102) and association (Step S103).

Next, the radio master unit 1 performs downlink data communication with the radio slave units 2. Specifically, the radio master unit 1 performs data communication with the radio slave units 2 by transmitting downlink data to the radio slave units 2 and receiving a response (ACK) from the respective radio slave units 2. The radio slave units 2 perform uplink data communication with the radio master unit 1. In detail, the radio slave units 2 perform data communication with the radio master unit 1 by transmitting uplink data to the radio master unit 1 and receiving a response (ACK) from the radio master unit 1. Thus, the radio master unit 1 performs data transmission and reception with the radio slave units 2 (Step S104).

Figure 5:
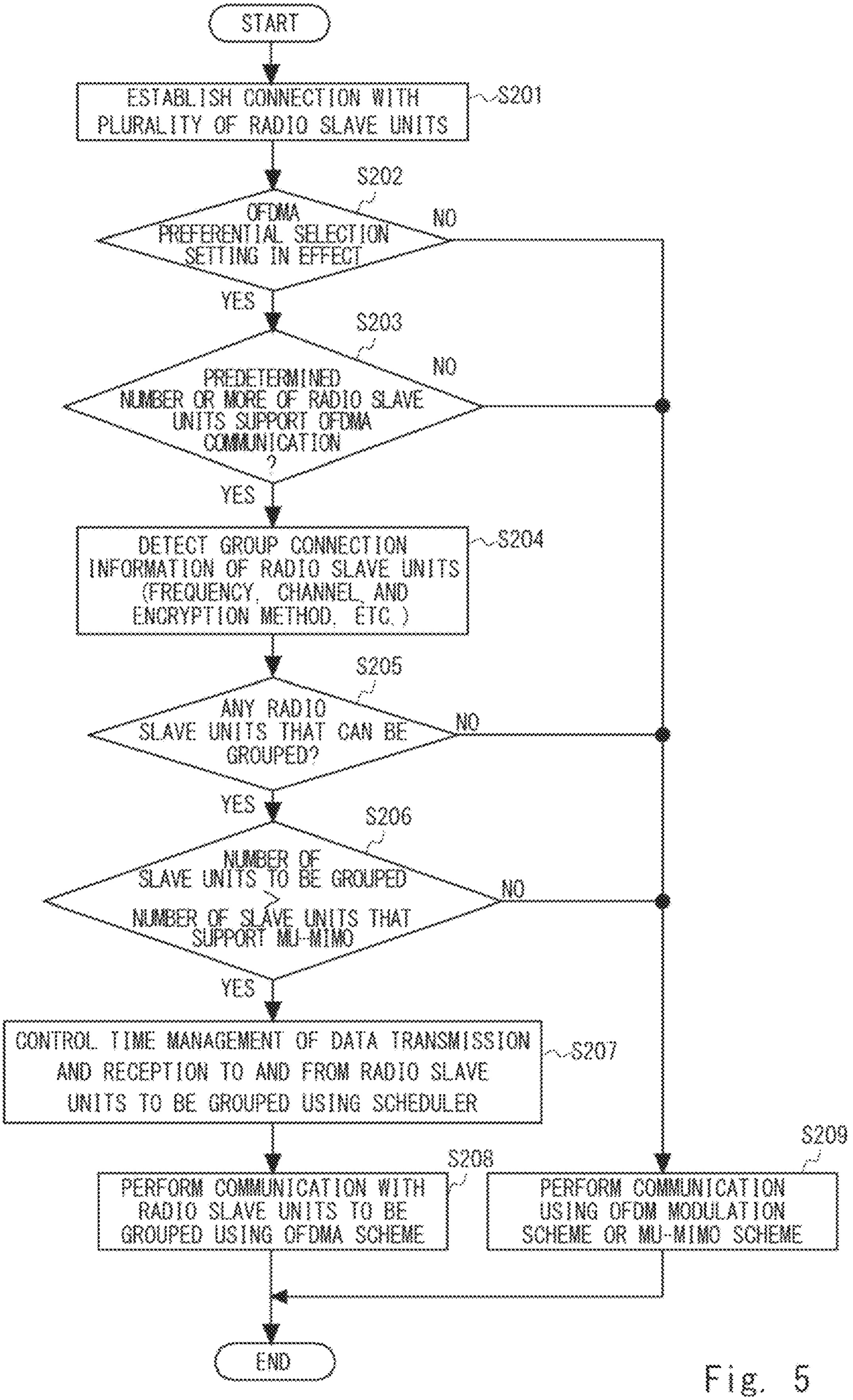
FIG. 5 is a flowchart showing an operation of a radio master unit according to the second example embodiment.

Next, a specific operation of communication between the radio master unit 1 and the radio slave units 2 according to the second example embodiment will be described with reference to FIG. 5.

First, the radio master unit 1 establishes a connection with the radio slave units 2 (radio slave units 21 to 2N), respectively (Step S201). The method by which the radio master unit 1 establishes a connection with the radio slave units 2 is shown in Steps S101 to S103 of FIG. 4. At this time, the radio master unit 1 acquires, from the radio slave units 2 which it has established connection with, the slave unit information about each of the radio slave units 2. The slave unit information includes information on whether the radio slave units 2 support IEEE802.11ax (support information) and support information for the OFDMA and MU-MIMO schemes. The slave unit information may include support information for the OFDM modulation scheme of the radio slave units 2. The slave unit information may include information on the frequency used for communication between the radio master unit 1 and the radio slave units 2, information on the channel, and information on the encryption method.

Next, the OFDMA control unit 14 of the radio master unit 1 determines whether or not the OFDMA preferential selection setting in the radio master unit 1 is in effect (Step S202). Here, the OFDMA preferential setting unit 13 performs OFDMA preferential selection setting based on the user input information of preferentially selecting the OFDMA scheme as the communication scheme for performing communication with the radio slave units 2 connected to the radio master unit 1. The OFDMA preferential selection setting is enabled or disabled according to the user operation of the GUI.

Next, when the OFDMA preferential selection setting in the radio master unit 1 is determined to be invalid (NO in Step S202), the OFDMA control unit 14 communicates with the radio slave units 2 that are connected to the master unit using the OFDM modulation scheme or the MU-MIMO scheme, respectively (Step S209). The OFDMA control unit 14 selects either the OFDM modulation scheme or the MU-MIMO scheme to be used in advance according to the capability of the connected radio slave units 2 and the design policy of the radio master unit 1.

For example, the OFDMA control unit 14 selects the OFDM modulation scheme or the MU-MIMO scheme according to whether the connected radio slave units 2 support the respective communication schemes. When the slave units support both communication schemes, the OFDMA control unit 14 selects the OFDM modulation scheme or the MU-MIMO scheme according to the parameters such as the communication status, e.g., the packet length used for communication with the connected radio slave units 2 and the number of the connected radio slave units 2.

On the other hand, when it is determined that the OFDMA preferential selection setting is in effect (YES in Step S202), the OFDMA control unit 14 determines whether there is a predetermined number or more of the radio slave units 2 that support OFDMA communication (Step S203).

When it is determined that a predetermined number or more of the connected radio slave units 2 do not support OFDMA communication (NO in Step S203), the OFDMA control unit 14 communicates with each of the radio slave units 2 using the OFDM modulation scheme or the MU-MIMO scheme (Step S209).

On the other hand, when it is determined that a predetermined number or more of the radio slave units 2 connected to the OFDMA control unit 14 support OFDMA communication (YES in Step S203), the connected-slave-unit detection unit 126 detects the group connection information from the slave unit information of each of the connected radio slave units 2 (Step S204). The group connection information includes information on whether or not the slave units support OFDMA communication. The group connection information includes information on the frequency, the channel and the encryption method used for communication with the radio master unit 1.

After the processing in Step S204, the connected-slave-unit detection unit 126 determines whether the connected radio slave units 2 are radio slave units 2 that can be grouped based on the group connection information (Step S205).

If the connected-slave-unit detection unit 126 determines that there is no radio slave unit 2 that can be grouped (NO in Step S205), the OFDMA control unit 14 communicates with each of the radio slave units 2 connected by the OFDM modulation scheme or the MU-MIMO scheme (Step S209).

On the other hand, when the connected-slave-unit detection unit 126 determines that there are radio slave units 2 that can be grouped (YES in Step S205), it groups the radio slave units 2. Using the group connection information, the connected-slave-unit detection unit 126 groups the radio slave units 2 that support OFDMA communication and match the frequency, the channel, and encryption method used for communication with the radio master unit 1. The connected-slave-unit detection unit 126 then furnishes information related to the grouping to the OFDMA control unit 14.

Next, the OFDMA control unit 14 determines whether or not the number of the radio slave units 2 to be grouped (the number of the slave units to be grouped) is larger than the number of the slave units that support the MU-MIMO scheme (the number of the slave units that support MU-MIMO) of the radio master unit 1 (Step S206). The number of the radio slave units 2 that support the MU-MIMO scheme is the same as the number of the radio slave units that the master unit 1 can simultaneously communicate with using the MU-MIMO scheme. As a result, the radio master unit 1 determines that communication with the radio slave units 2 using the OFDMA scheme can be performed with shorter communication completion time than communication with the radio units 2 using the MU-MIMO scheme.

In this example embodiment, the number to be compared with the number of the radio slave units to be grouped is set as the number of the radio slave units that support MU-MIMO, but any number may be set as the number to be compared with the number of the slave units to be grouped. By doing so, the radio master unit 1 determines that the communication with the radio slave units 2 using the OFDMA scheme is more effective than the communication with the radio slave units 2 using the OFDM modulation scheme in shortening the communication completion time and reducing occurrence of delay in data transmission.

Next, when the number of the slave units to be grouped is equal to or less than the number of the radio slave units that support MU-MIMO (NO in Step S206), the OFDMA control unit 14 communicates with each of the radio slave units 2 connected based on the OFDM modulation scheme or the MU-MIMO scheme (Step S209).

Figure 6:
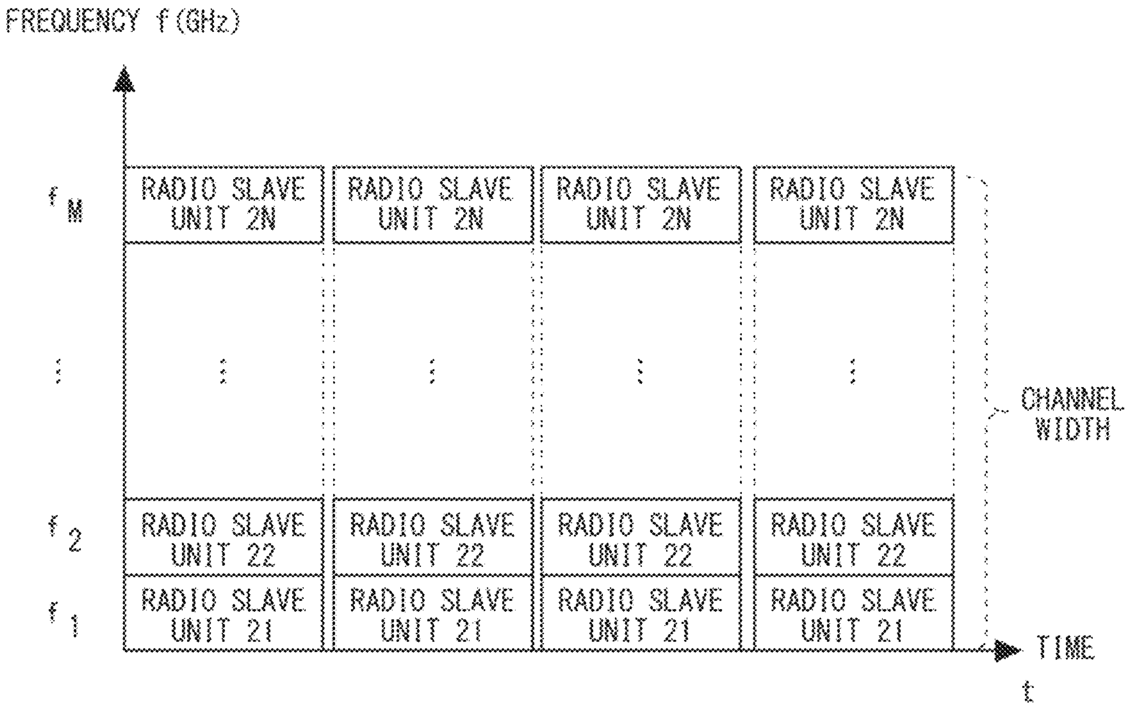
FIG. 6 is a diagram showing a method of allocating transmission and reception data to radio slave units to be grouped using the OFDMA scheme of the radio master unit according to the second example embodiment.

On the other hand, when the number of the slave units to be grouped is larger than the number of the slave units that support MU-MIMO (YES in Step S206), the OFDMA control unit 14 allocates a predetermined subcarrier frequency to the radio slave units 2 to be grouped as shown in FIG. 6 described below. The OFDMA control unit 14 controls the time management of data transmission and reception to and from the radio slave units 2 to be grouped using a scheduler (Step S207).

FIG. 6 shows a method of allocating transmission and reception data to the radio slave units 2 to be grouped using the OFDMA scheme of the radio master unit 1 according to the second example embodiment. As shown in FIG. 6, the OFDMA control unit 14 divides the frequency band of the channel width into subcarrier frequencies (f1 to fM) having fixed subcarrier spacing. The OFDMA control unit 14 then allocates each of the subcarrier frequencies to the radio slave units 2 (radio slave units 21 to 2N) to be grouped. Thus, the OFDMA control unit 14 averages the volume of data to be transmitted and received to and from the radio slave units 2 to each of which a subcarrier frequency is allocated, whereby the master unit 1 can simultaneously communicate with each of the radio slave units 2.

The OFDMA control unit 14 then communicates with each of the radio slave units 2 to which the subcarrier frequencies are allocated using the OFDMA scheme (Step S208). Specifically, the OFDMA control unit 14 averages the volume of data to be transmitted and received to and from the radio slave units 2 to be grouped among the radio slave units 2 to be grouped, and executes control of OFDMA communication with the radio slave units 2 to be grouped.

Figure 7:
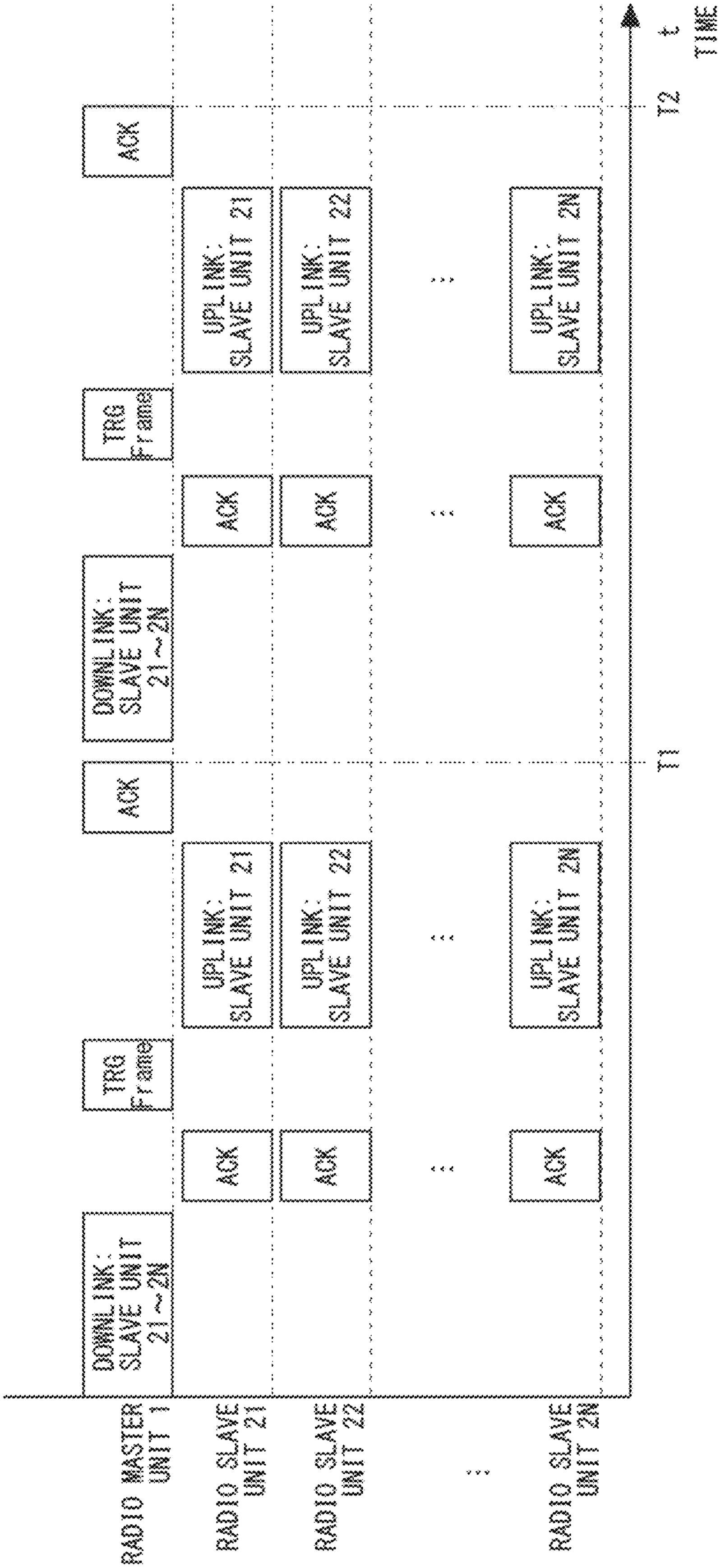
FIG. 7 is a diagram showing a data communication procedure of a communication performed between a radio master unit and radio slave units using the OFDMA scheme according to the second example embodiment.

For example, the radio master unit 1 communicates with the radio slave units 2 to be grouped according to the communication procedure shown in FIG. 7. FIG. 7 shows the data communication procedure between the radio master unit 1 and the radio slave units 2 using the OFDMA scheme according to the second example embodiment. As shown in FIG. 7, when the radio master unit 1 transmits downlink data to the radio slave units 2 (21 to 2N) simultaneously, the plurality of radio slave units 2 return the ACK signal as an acknowledgement of receipt of the downlink data to the radio master unit 1 after the reception of the data is completed. On the other hand, when the plurality of the radio slave units 2 transmit the uplink data to the radio master unit 1, the radio master unit 1 transmits the trigger frame (TRG Frame) to all of the radio slave unit 2. Then, each of the radio slave units 2 simultaneously transmits data to the radio master unit 1 using the subcarrier frequency allocated to each of the radio slave units 2 according to the trigger frame. Then, after the reception of the data is completed, the radio master unit 1 returns the ACK signal confirming acknowledgement of receipt to each of the radio slave units 2.

As described above, when the number of the radio slave units 2 to be connected to the radio master unit 1 according to the second example embodiment is larger than a predetermined number, the radio master unit 1 according to the second example embodiment can perform more effective communication with the connected radio slave units 2 using the OFDMA scheme than using the MU-MIMO scheme or the OFDM modulation scheme. Details will be described hereinafter.

The number of the radio slave units 2 that the radio master unit 1 can simultaneously communicate with using the MU-MIMO scheme depends on the number of antennas of the radio master unit 1. Therefore, when there are many radio slave units 2 that support the channel width of the radio master unit 1 and data communication with low transmission delay is performed using short packets, the radio master unit 1 can communicate with the radio slave units 2 with shorter communication completion time by using the OFDMA scheme rather than the MU-MIMO scheme.

In addition, when the radio master unit 1 is connected to a predetermined number of more of the radio slave units 2, in communication between the radio master unit 1 and the connected radio slave units 2 using the OFDMA scheme, it is possible to shorten the communication completion time and reduce occurrence of delay in data transmission caused by signal collision compared to communication using the OFDM modulation scheme.

Specifically, the case in which the radio master unit 1 communicates with the radio slave units 2 using the OFDM modulation scheme is compared with the case in which the radio master unit 1 communicates with the radio slave units 2 using the OFDMA scheme. First, a comparative example in which the radio master unit 1 communicates with the radio slave units 2 using the OFDM modulation scheme will be explained. The configuration of the communication system according to the comparative example is similar to that of the communication system 200 shown in FIG. 2.

Figure 8:
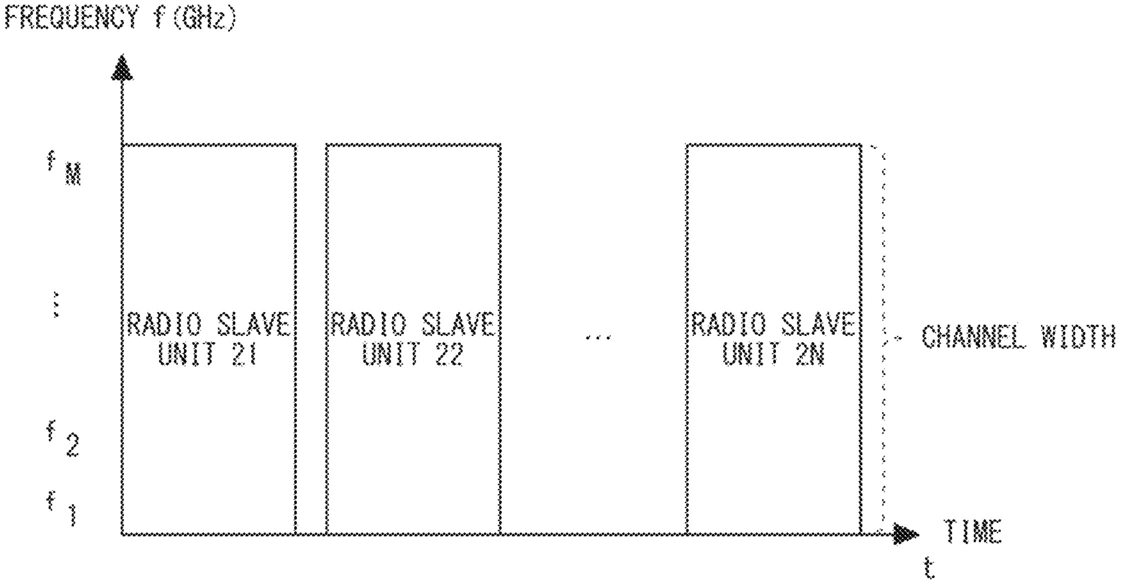
FIG. 8 is a diagram showing a method of allocating transmission and reception data from a radio master unit to radio slave units using the OFDM modulation scheme according to a comparative example.

FIG. 8 shows a method of allocating transmission and reception data from the radio master unit 1 to the radio slave units 2 (radio slave units 21 to 2N) using the OFDM modulation scheme according to a comparative example. As shown in FIG. 8, the entire frequency band of the channel width of the radio master unit 1 is used by one of the radio slave units 2. When there are a plurality of radio slave units 2 to be connected with, the radio master unit 1 communicates with each of the radio slave units 2 at a time difference of time (t).

Figure 9:
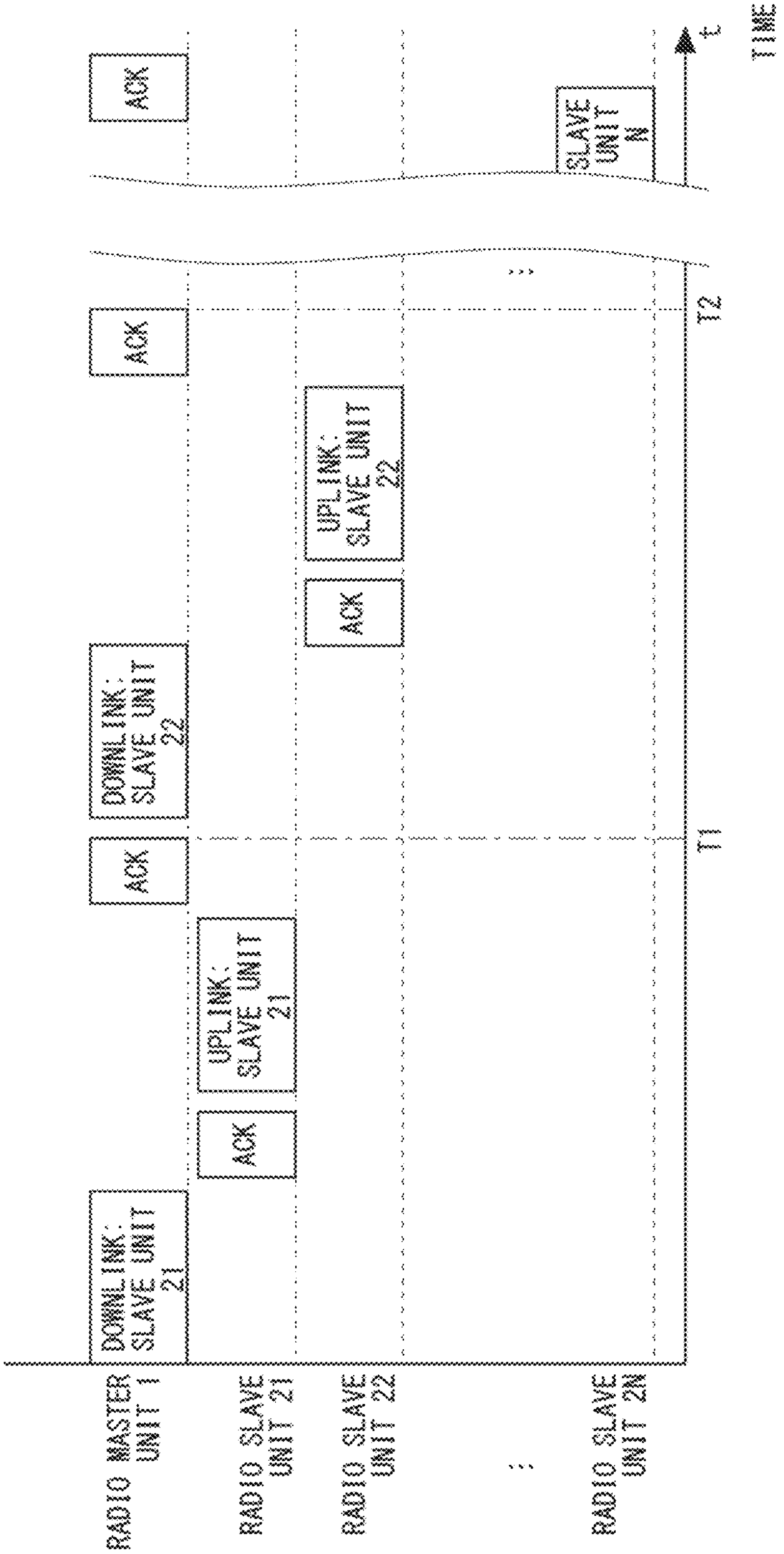
FIG. 9 is a diagram showing a data communication procedure of a communication performed between a radio master unit and radio slave units using the OFDM modulation scheme according to a comparative example.

FIG. 9 shows a data communication procedure with the radio slave units 2 by OFDM modulation in the radio master unit 1 according to a comparative example. As shown in FIG. 9, when the radio master unit 1 transmits downstream data to the radio slave unit 21, the radio slave unit 21 returns an ACK signal as an acknowledgement of receipt of the downstream data to the radio master unit 1 after the reception of the data is completed. On the other hand, when the radio slave units 21 transmit upstream data to the radio master unit 1, the radio slave units 21 return an ACK signal as an acknowledgement of receipt of the upstream data to the radio master unit 1 after the reception is completed. At this time, the data communication time required between the radio master unit 1 and the radio slave unit 21 is T1. Similarly, the time taken for the radio master unit 1 and the radio slave unit 22 to perform data communication is T2. Therefore, when data communication is performed between the same radio master unit 1 and a plurality of radio slave units 2 (21 to 2N), it takes a certain amount of time (T1+T2+ . . . +TN) to complete data communication with the first radio slave unit 21 to the last radio slave unit 2N.

Figure 10:
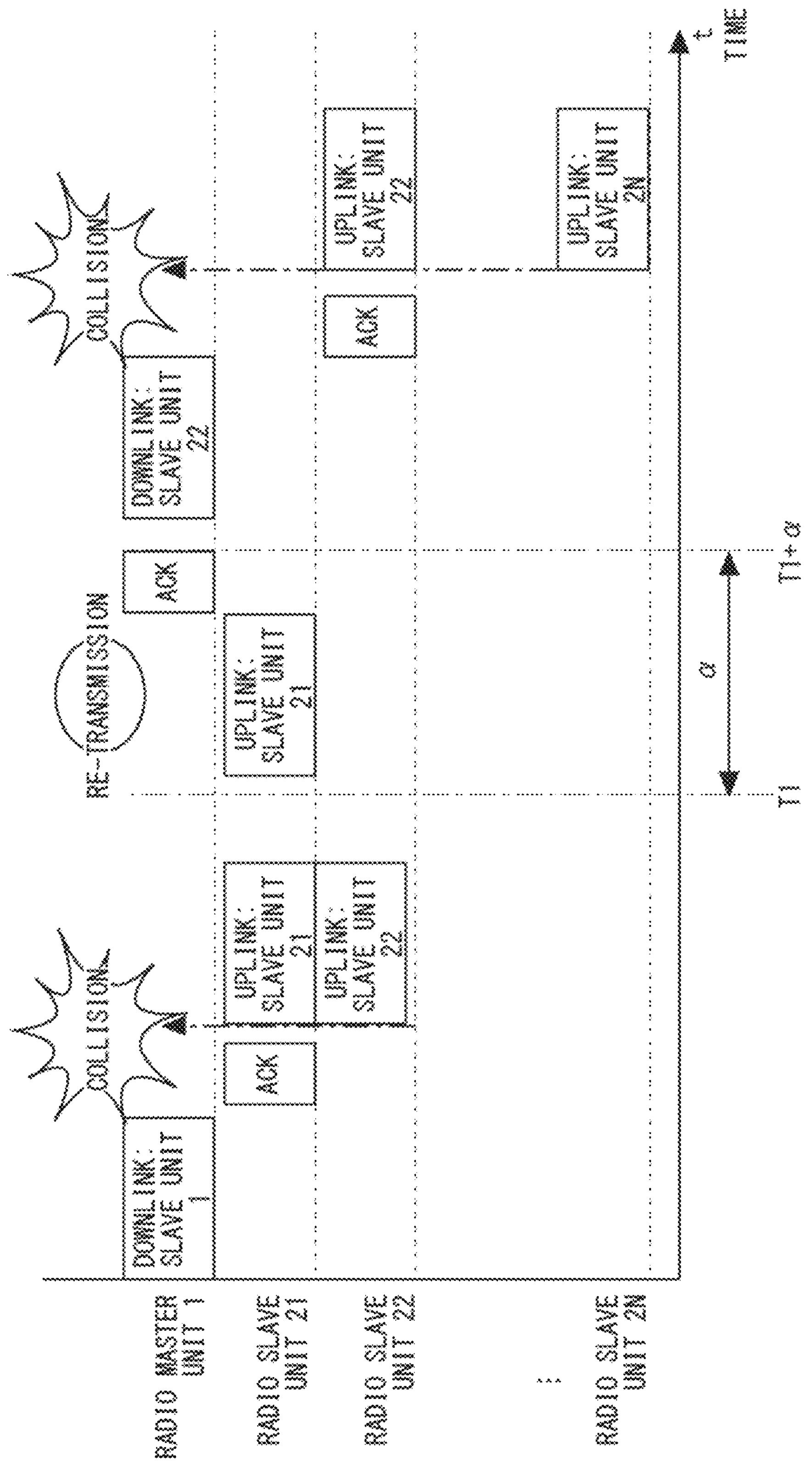
FIG. 10 is a diagram showing an example of a case in which a signal collision occurs in a data communication procedure of a communication performed between a radio master unit and radio slave units using the OFDM modulation scheme according to a comparative example.

FIG. 10 shows an example of a case in which a collision of signals occurs in the radio master unit 1 in a data communication procedure with the radio slave units 2 using the OFDM modulation scheme according to a comparative example. As shown in FIG. 10, when the radio slave unit 21 and the radio slave unit 22 transmit uplink data to the radio master unit 1 at the same time, the radio master unit 1 cannot recognize the data received from the radio slave unit 21 and the data received from the radio slave unit 22 due to collision of the signals from the respective units. In such a case, the radio slave unit 21 needs to re-transmit uplink data, and the time (T1+$\alpha$) obtained by adding the re-transmission time due to the collision of signals to the time (T1) for the radio master unit 1 to complete data communication with the radio slave unit 21 is required.

On the other hand, as shown in FIG. 7, when the radio master unit 1 according to the second example embodiment communicates with the radio slave units 2 (21 to 2N) using the OFDMA scheme, since simultaneous communication is possible, mutual data communication is completed in at least time T1. However, when the radio master unit 1 according to the comparative example communicates with the plurality of radio slave units 2 (21 to 2N) using the OFDMA scheme, mutual data communication is completed in at least time T1+T2+ . . . +TN. Therefore, when the radio master unit 1 is connected to a predetermined number of more of the radio slave units 2, communication with the plurality of radio slave units 2 using the OFDMA scheme can shorten the communication completion time and reduce occurrence of delay in data transmission caused by the collision of signals, compared with communication using the OFDM modulation scheme.

Therefore, when the radio master unit 1 is connected to a predetermined number or more of the radio slave units 2, the communication completion time with the radio slave unit 2 can be shortened by using the OFDMA scheme rather than the OFDM modulation scheme, and at the same time, occurrence of delay in data transmission caused by the re-transmission of data by the radio slave units 2 due to the collision of the transmission signals between the radio slave units 2 to the radio master unit 1 can be reduced. That is, when the radio master unit 1 according to the second example embodiment is connected to a plurality of radio slave units 2, the radio master unit 1 can effectively communicate with the radio slave units 2 by using the OFDMA scheme rather than the OFDM modulation scheme.

Third Example Embodiment

Figure 11:
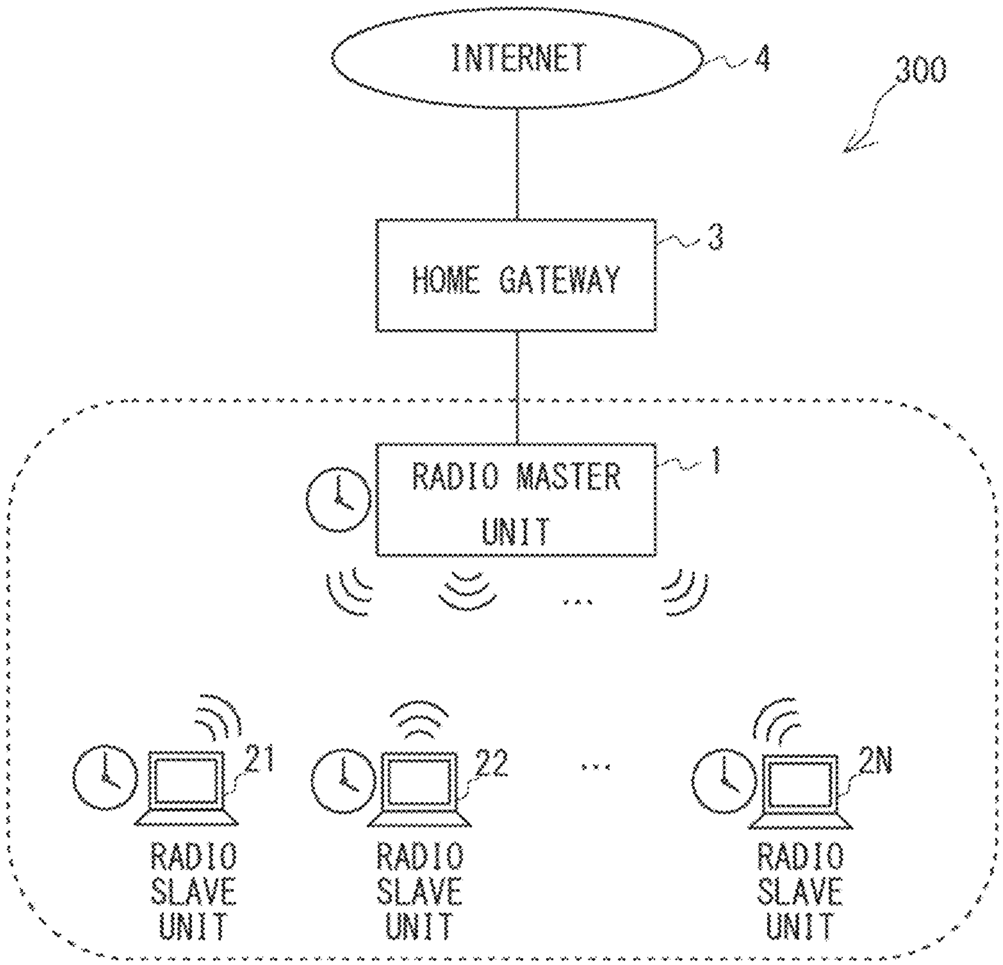
FIG. 11 is a diagram showing a configuration of a communication system according to a third example embodiment.

A configuration of a communication system 300 according to a third example embodiment will be described with reference to FIG. 11. The communication system 300 includes the radio master unit 1, the radio slave units 2 (radio slave units 21 to 2N), and the home gateway 3, like the communication system 200 according to the second example embodiment.

The radio master unit 1 and the radio slave units 2 configure a radio network N in which communication is performed between the radio master unit 1 and the radio slave units 2 in an infrastructure mode. In this example embodiment, the radio master unit 1 performs time synchronization with the radio slave units 2 connected in the radio network N using NTP (Network Time Protocol). The radio master unit 1 manages the time difference with each of the radio slave units 2 based on the time stamp information in the data communication, and reduces the time difference.

Figure 12:
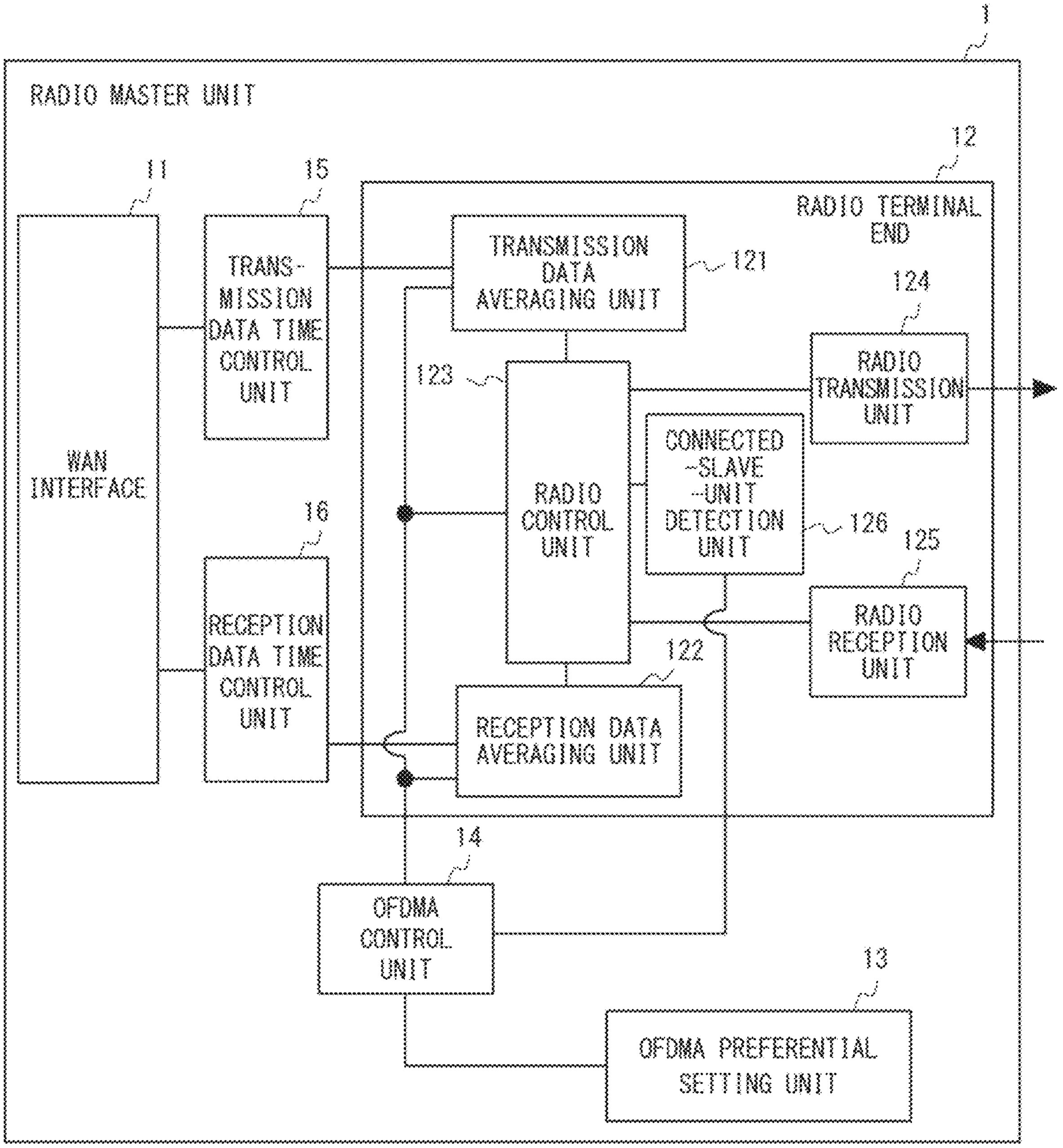
FIG. 12 is a block diagram showing a configuration of a radio master unit according to the third example embodiment.

Next, the configuration of the radio master unit 1 according to the third example embodiment will be described with reference to FIG. 12.

The radio master unit 1 according to the third example embodiment includes a transmission data time control unit 15 and a reception data time control unit 16 in addition to the configuration of the radio master unit 1 according to the second example embodiment. Accordingly, the radio master unit 1 has a function of reducing the time difference between the respective radio slave units 2 in the OFDMA preferential selection function.

The transmission data time control unit 15 performs time synchronization with the radio slave units 2 to be communicated with using NTP to control and reduce the transmission time difference among the radio slave units 2 of data transmitted to the radio slave units 2 to be communicated with. For example, when communicating with the radio slave units 2 using the OFDMA scheme, the transmission data time control unit 15 performs control to reduce the transmission time difference of data to be transmitted to the radio slave units 2 to be grouped.

The reception data time control unit 16 performs time synchronization with the radio slave units 2 to be communicated with using NTP to control and reduce the reception time difference among the radio slave units 2 of data received from the radio slave units 2 to be communicated with. For example, when communicating with the radio slave units 2 using the OFDMA scheme, the reception data time control unit 16 controls to reduce the reception time difference of data received from the radio slave units 2 to be grouped between the radio slave units 2 to be grouped.

As described above, in the communication system 300 according to the third example embodiment, in addition to the OFDMA preferential selection function described in the communication system 200 according to the second example embodiment, it is possible to reduce the time difference between the radio slave units 2 communicating based on the time stamp information in the data communication.

It should be noted that the present disclosure is not limited to the above example embodiments, and can be changed to the extent that it does not deviate from the gist of the present disclosure.

<Hardware Configuration>

Figure 13:
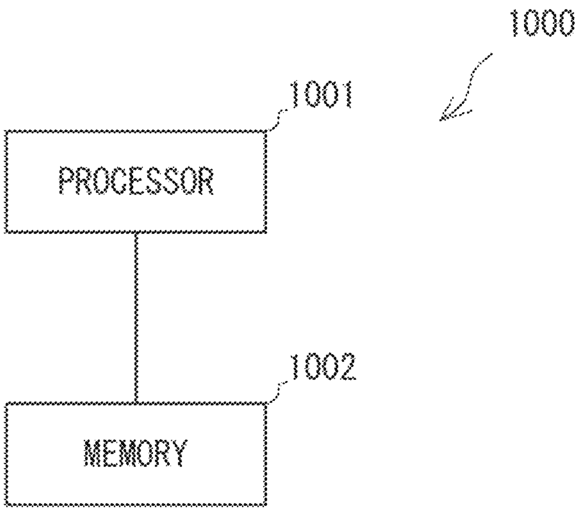
FIG. 13 is a block diagram showing an example of a hardware configuration of a computer according to this example embodiment.

Next, a hardware configuration example of a computer 1000 of the radio master unit 1 according to the first, second, and third example embodiments will be described with reference to FIG. 13. In FIG. 13, the computer 1000 has a processor 1001 and a memory 1002. The processor 1001 may be, for example, a microprocessor, a Micro Processing Unit (MPU), or a Central Processing Unit (CPU). The processor 1001 may include a plurality of processors. The memory 1002 includes a combination of volatile memory and non-volatile memory. The memory 1002 may include storage located separately from the processor 1001. In such a case, the processor 1001 may access the memory 1002 through an unillustrated I/O interface.

In addition, each configuration in the above-described example embodiments is composed of hardware or software or both, and may be composed of one hardware and/or software, or may be composed of a plurality of hardware and/or software. The functions (processing) of each configuration in the example embodiments described above may be implemented by a computer. For example, a program for performing the method according to the example embodiments may be stored in the memory 1002, and each function may be implemented by executing the program stored in the memory 1002 by the processor 1001.

The program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims.

This application is based upon and claims the benefit of priority from Japanese patent application No. 2021-192844, filed on Nov. 29, 2021, the disclosure of which is incorporated herein in its entirety by reference.

REFERENCE SIGNS LIST

1, 1A RADIO MASTER UNIT
2 (21 to 2N) RADIO SLAVE UNIT
3 HOME GATEWAY
4 INTERNET
11 WAN INTERFACE
12 RADIO TERMINAL END
13 OFDMA PREFERENTIAL SETTING UNIT
14 OFDMA CONTROL UNIT
15 TRANSMISSION DATA TIME CONTROL UNIT
16 RECEPTION DATA TIME CONTROL UNIT
21 RADIO SLAVE UNIT
22 RADIO SLAVE UNIT
121 TRANSMISSION DATA AVERAGING UNIT
122 RECEPTION DATA AVERAGING UNIT
123 RADIO CONTROL UNIT
124 RADIO TRANSMISSION UNIT
125 RADIO RECEPTION UNIT
126 CONNECTED-SLAVE-UNIT DETECTION UNIT
200 COMMUNICATION SYSTEM
300 COMMUNICATION SYSTEM
1000 COMPUTER
1001 PROCESSOR
1002 MEMORY

What is claimed is:

1. A radio master unit comprising:
at least one memory storing instructions, and
at least one processor configured to execute the instructions to:
make a setting based on user input information to preferentially select an OFDMA (Orthogonal Frequency Division Multiple Access) scheme as a communication scheme for performing communication with a plurality of radio slave units connected to a master unit;
detect a number of the radio slave units to be communicated with among the plurality of the radio slave units connected to the master unit when the setting to preferentially select the OFDMA scheme is made; and
execute control of OFDMA communication with the radio slave units to be communicated with by averaging the volume of data to be transmitted and received to and from the respective radio slave units to be communicated with among the radio slave units to be communicated with when the number of the radio slave units to be communicated with is larger than a predetermined number.

2. The radio master unit according to claim 1, wherein the at least one processor is further configured to execute the instructions to:
synchronize time with the radio slave units to be communicated with by using NTP (Network Time Protocol) to reduce transmission time difference of data to be transmitted to the radio slave units to be communicated with among the radio slave units to be communicated with; and
synchronize time with the radio slave units to be communicated with by using NTP to reduce reception time difference of data to be received from the radio slave units to be communicated with among the radio slave units to be communicated with.

3. The radio master unit according to claim 1, wherein the predetermined number of the radio slave units to be communicated with is the number of radio slave units that the radio master unit can simultaneously communicate with using a MU-MIMO (Multi-User MIMO) scheme.

4. The radio master unit according to claim 1, wherein the setting to preferentially select the OFDMA scheme as the communication scheme for performing communication with the plurality of the radio slave units connected to the radio master unit is made based on user input information acquired from a graphical user interface (GUI) mounted on the radio master unit.

5. The radio master unit according to claim 1, wherein the at least one processor is further configured to execute the instructions to group, among the plurality of the radio slave units connected to the master unit, the radio slave units which support OFDMA communication as the radio slave units to be communicated with and which match the frequency used for communication with the master unit, a channel used for communication with the master unit, and an encryption method used for communication with the master unit.

6. The radio master unit according to claim 1 wherein when the setting to preferentially select the OFDMA scheme is not made, the at least one processor is further configured to execute the instructions to perform control to communicate with the plurality of the radio slave units connected to the master unit using an MU-MIMO scheme.

7. The radio master unit according to claim 1, wherein when the setting to preferentially select the OFDMA scheme is not made, the at least one processor is further configured to execute the instructions to perform control to communicate with the plurality of the radio slave units connected to the master unit using an OFDM (Orthogonal Frequency Division Multiplexing) modulation scheme.

8. The radio master unit according to claim 1, wherein when the number of the radio slave units to be communicated with is less than or equal to a predetermined number, the at least one processor is further configured to execute the instructions to perform control to communicate with the plurality of the radio slave units connected to the master unit using an MU-MIMO scheme.

9. A control method for a radio master unit comprising:
making a setting based on user input information to preferentially select thean OFDMA scheme as a communication scheme for performing communication with a plurality of radio slave units connected to the radio master unit;
detecting a number of the radio slave units to be communicated with among the plurality of the radio slave units connected to the radio master unit when the setting is made to preferentially select the OFDMA scheme; and
executing control of OFDMA communication with the radio slave units to be communicated with by averaging the volume of data to be transmitted and received to and from the respective radio slave units to be communicated among the radio slave units to be communicated with when the number of the radio slave units to be communicated with is larger than a predetermined number.

10. A non-transitory computer-readable medium storing a program for causing a computer to execute processes of:

making a setting based on user input information to preferentially select thean OFDMA scheme as a communication scheme for performing communication with a plurality of radio slave units connected to a radio master unit;

detecting a number of the radio slave units to be communicated with among the plurality of the radio slave units connected to the radio master unit when the setting is made to preferentially select the OFDMA scheme; and executing control of OFDMA communication with the radio slave units to be communicated with by averaging the volume of data to be transmitted and received to and from the respective radio slave units to be communicated with among the radio slave units to be communicated with when the number of the radio slave units to be communicated with is larger than a predetermined number.

* * * * *